J. F. O'CONNOR.
FRICTION DRAFT RIGGING.
APPLICATION FILED JULY 21, 1910.
981,790.
Patented Jan. 17, 1911.
2 SHEETS—SHEET 1.
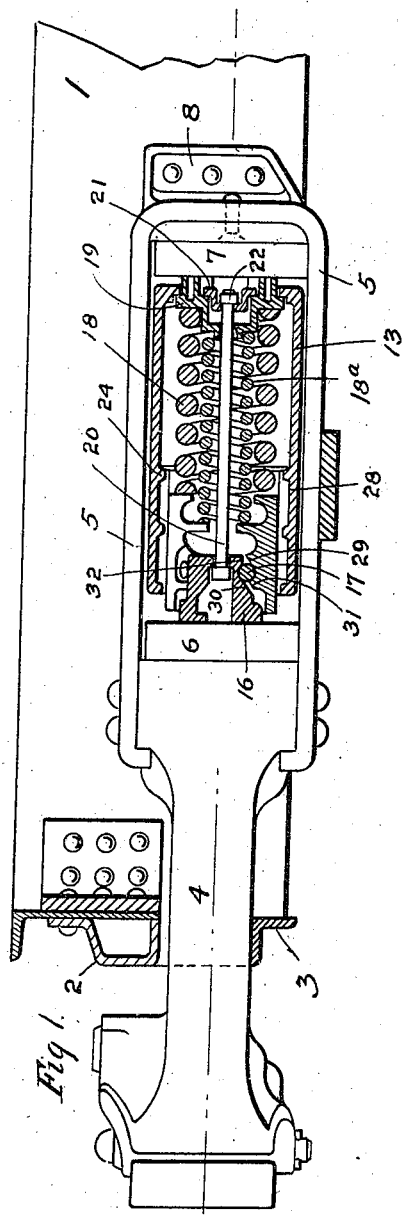
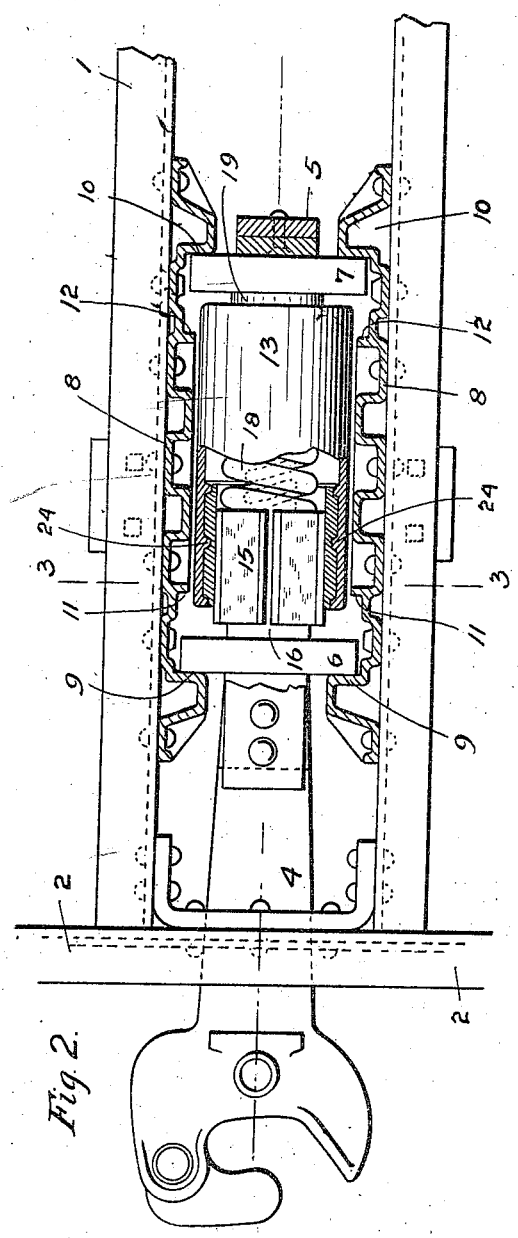
WITNESSES:
F. B. Townsend
A. W. Munday
INVENTOR
John F. O'Connor
By Munday, Evarts, Adcock & Clark
His Attys.

J. F. O'CONNOR.
FRICTION DRAFT RIGGING.
APPLICATION FILED JULY 21, 1910.

981,790.

Patented Jan. 17, 1911.

2 SHEETS—SHEET 2.

WITNESSES:
F. B. Townsend

INVENTOR
John F. O'Connor
By Munday, Evarts, Adcock & Clarke
His Attys

UNITED STATES PATENT OFFICE.

JOHN F. O'CONNOR, OF CHICAGO, ILLINOIS, ASSIGNOR TO WILLIAM H. MINER, OF CHICAGO, ILLINOIS.

FRICTION DRAFT-RIGGING.

981,790.

Specification of Letters Patent. Patented Jan. 17, 1911.

Application filed July 21, 1910. Serial No. 573,004.

*To all whom it may concern:*

Be it known that I, JOHN F. O'CONNOR, a citizen of the United States, residing in Chicago, in the county of Cook and State of Illinois, have invented a new and useful Improvement in Friction Draft-Rigging, of which the following is a specification.

My invention relates to improvements in friction draft rigging for railway cars.

Figure 5:
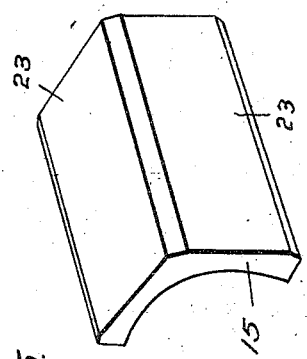
Figure 6:
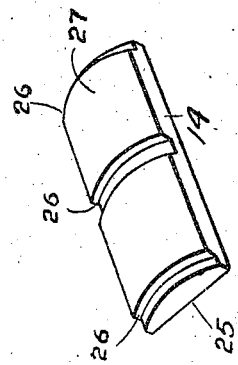
Figure 3:
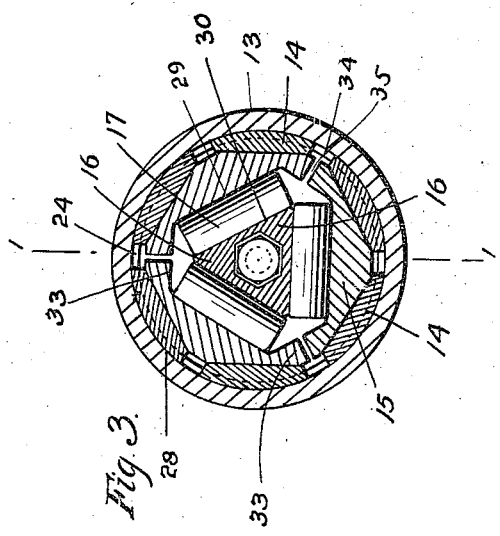
Figure 4:
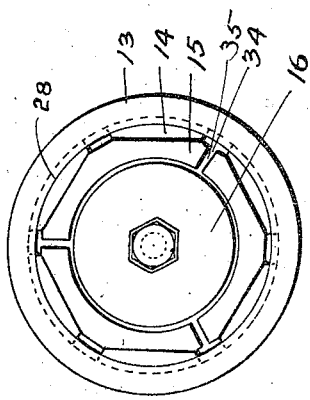

In the accompanying drawing forming a part of this specification, Figure 1 is a side elevation, partly in central, vertical, longitudinal section of a friction draft rigging embodying my invention. Fig. 2 is a plan view, partly in horizontal section. Fig. 3 is a cross section of the friction shell and contained parts on line 3—3 of Fig 2. Fig. 4 is an end view of the friction shell and contained parts. Fig. 5 is a detail perspective view of one of the friction shoes; and Fig. 6 is a detail perspective view of one of the segmental friction plates with which the cylindrical friction shell is provided.

In the drawing, 1 represents the center sills or draft members of the car frame to which the draft rigging is applied, 2 the front still 3 the carry iron, 4 the draw-bar, 5 the draft yoke, 6, 7 front and rear followers, 8, 8 the stop members secured to the draft sills, having front stop shoulders 9, rear stop shoulders 10 and limiting stop shoulders 11. 12, 13 the friction shell, 14 segmental friction plates with which the friction shell is provided, 15 the friction shoes, 16 the wedge, 17 anti-friction rollers interposed between the wedge and friction shoes, 18, 18ª the springs, 19 a preliminary compression supplemental follower interposed between the rear follower and the spring to permit of a preliminary compression of the springs before the friction resistance mechanism comes into action, 20 the connecting rod and 21 a bearing cap interposed between the nut 22 of the connecting rod and the preliminary compression follower.

In order to give the friction shoes a perfect bearing against the coöperating friction element throughout substantially the entire area of their friction faces 23, and at the same time enable the friction shell to be of circular form in cross section and thus adapted to properly withstand the enormous bursting strain to which it is subjected in practical operation, I provide the friction shell with one or more, preferably three, transversely extending annular ribs or friction plate anchoring devices 24, and with a plurality of separate piece friction plate members 14, each having a flat friction face 25 for engagement with the flat friction face 23 of the friction shoe 15, the friction plates 14 being also furnished with annular grooves or anchoring devices 26 to interfit with and engage the coöperating anchoring devices 24 of the friction shell 13.

The friction shoes 15 are preferably three in number, and each is provided with two flat friction faces 23 so that each friction shoe thus engages two of the segmental friction plates 14, the friction plates 14 being preferably six in number. Each of the friction plates 14 has a convexly curved cylindrical face 27 to fit the concave inner cylindrical face 28 of the friction shell 13.

Each of the friction shoes 15 has an inclined or wedge face 29 for coöperation with the wedge face 30 of the wedge 16, the wedge being of pyramidal shape and having three wedge faces. Each of the friction shoes is further provided with a transverse shoulder 31 to serve as a stop for the anti-friction roller 17, the wedge 16 having a coöperating stop shoulder 32. Each of the friction shoes is also furnished with a pair of side shoulders 33 for engagement with the ends of the anti-friction roller 17 and thus keep the roller lengthwise in position.

Between the adjacent friction plates 14, clearance space 34 is left so that the friction shoes and friction plates automatically adjust themselves to each other and thus insure an even bearing throughout their interengaging flat friction faces.

The interengaging anchoring devices on the friction shell 13 and segmental friction plates 14 hold the friction plates rigidly in position longitudinally in the friction shell and prevent them from slipping lengthwise therein.

Clearance spaces 35 are left between the adjacent longitudinal edges of the friction shoes 15 to enable the friction shoes to automatically adjust themselves properly to the faces of the wedge and thus compensate for any untrueness or irregularity in the angles of the wedge or of the roll seats or bearing faces of the shoes themselves.

The clearance spaces 34 between the friction plates 14 and 35 between the friction shoes 15 enable the friction plates and friction shoes to accommodate themselves automatically to the wedge and to the interior surface of the cylinder, thus rendering it unnecessary to machine or grind any of the parts. This materially reduces the cost of manufacture. My improved construction of friction draft gear is thus very simple to manufacture, avoiding as it does all curved or arc shaped friction surfaces which are difficult to produce with the necessary degree of accuracy. In my invention all contacting friction faces are straight, flat, planes, and each pair of interengaging friction faces is independently and automatically adjustable to each other independent of any and every other pair, thus making grinding, machining or fitting of the parts unnecessary. And as in my invention, each pair of friction faces are independently and automatically adjustable or capable of accommodating themselves to each other, independent of the others, it becomes immaterial whether the interior surface of the cylinder or shell 13 is truly cylindric or otherwise. In my invention also, the friction plates 14 being separate and removable from the cylinder, may be readily renewed or replaced when worn and the draft gear thus restored to perfect operative condition at small expense. The friction plates 14 may, if desired, be made of non-corrosive metal, such as brass, and thus prevent the parts from becoming rusted or cemented together if the gear or the car happens to remain for months out of service. The friction plates 14 are preferably made of some soft metal, such as brass or malleable iron and the friction shoes 15 are preferably made of tempered or hardened steel, their shape and form being such as to enable them to be very perfectly made of such material.

I claim:—

1. In a friction draft rigging, the combination with a draw-bar, draft yoke, spring and followers, of a friction shell furnished with transversely extending annular anchoring ribs, a plurality of segmental friction plates having convex outer faces fitting the concave inner face of the friction shell, and provided with transversely extending anchoring channels and with straight, flat inner friction faces, friction shoes having straight flat friction faces engaging said friction faces of said friction plates, a wedge and anti-friction rollers interposed between the wedge and friction shoes, substantially as specified.

2. In a friction draft rigging, a friction shell having anchoring devices on its inner face, segmental friction plates having convex outer faces and coöperating anchoring devices, and provided each with a straight, flat, friction face and friction shoes having straight, flat, friction faces engaging said straight flat faces of said segmental friction plates, substantially as specified.

3. In a friction draft rigging, a friction shell having anchoring devices on its inner face, segmental friction plates having convex outer faces and coöperating anchoring devices, and provided each with a straight, flat, friction face and friction shoes having straight, flat friction faces engaging said straight flat faces of said segmental friction plates, each of said friction shoes having two straight, flat, friction faces disposed at an angle to each other for simultaneous engagement with two adjacent friction plates, substantially as specified.

4. In a friction draft rigging, the combination with a friction shell, of segmental friction plates fitting inside said friction shell and having each an inner, straight, flat friction face, and friction shoes having straight, flat friction faces in sliding frictional engagement with said friction plates, and means for preventing said friction plates from moving longitudinally in respect to said shell, substantially as specified.

5. In a friction draft rigging, the combination with a friction shell, of segmental friction plates fitting inside said friction shell and having each an inner, straight, flat friction face, and friction shoes having straight, flat friction faces in sliding frictional engagement with said friction plates, and means for preventing said friction plates from moving longitudinally in respect to said shell, there being clearance spaces between the longitudinal edges of said friction plates, substantially as specified.

JOHN F. O'CONNOR.

Witnesses:
 EDMUND ADCOCK,
 H. M. MUNDAY.